US009330496B2

(12) United States Patent
Tomokage et al.

(10) Patent No.: US 9,330,496 B2
(45) Date of Patent: May 3, 2016

(54) THREE DIMENSIONAL COORDINATE LOCATION DEVICE, METHOD FOR SAME, AND PROGRAM

(75) Inventors: Hajime Tomokage, Fukuoka (JP); Hidemichi Kawase, Tokyo (JP); Osamu Horiuchi, Fukuoka (JP)

(73) Assignee: Fukuoka University, Fukuoka (JP)

( * ) Notice: Subject to any disclaimer, the term of this patent is extended or adjusted under 35 U.S.C. 154(b) by 458 days.

(21) Appl. No.: 13/519,079

(22) PCT Filed: Dec. 22, 2010

(86) PCT No.: PCT/JP2010/073176
§ 371 (c)(1),
(2), (4) Date: Aug. 16, 2012

(87) PCT Pub. No.: WO2011/081070
PCT Pub. Date: Jul. 7, 2011

(65) Prior Publication Data
US 2012/0306870 A1    Dec. 6, 2012

(30) Foreign Application Priority Data

Dec. 28, 2009    (JP) .................................. 2009-297692

(51) Int. Cl.
G06T 15/00    (2011.01)
G06T 19/00    (2011.01)
(52) U.S. Cl.
CPC ...................................... G06T 19/00 (2013.01)
(58) Field of Classification Search
None
See application file for complete search history.

(56) References Cited

U.S. PATENT DOCUMENTS

| | | | | |
|---|---|---|---|---|
| 5,712,965 A | * | 1/1998 | Fujita et al. | 345/419 |
| 7,215,325 B2 | | 5/2007 | Kim | |
| 2005/0231530 A1 | * | 10/2005 | Liang et al. | 345/619 |
| 2006/0284871 A1 | * | 12/2006 | Kee et al. | 345/423 |
| 2009/0213112 A1 | * | 8/2009 | Zhu et al. | 345/419 |

FOREIGN PATENT DOCUMENTS

| | | |
|---|---|---|
| CN | 1443342 A | 9/2003 |
| JP | 6-250777 | 9/1994 |
| JP | 2003-167924 | 6/2003 |
| JP | 2003-167924 A | 6/2003 |
| JP | 2003167924 A * | 6/2003 |
| WO | WO 01/97174 A1 | 12/2001 |

OTHER PUBLICATIONS

International Search Report of International Application No. PCT/JP2010/073176 dated Mar. 29, 2011 (2 pages).

* cited by examiner

Primary Examiner — Kee M Tung
Assistant Examiner — Yi Wang
(74) Attorney, Agent, or Firm — Fay Sharpe LLP

(57) ABSTRACT

There is provided a 3-dimensional coordinate specifying device which can accurately specify a set or sets of optional coordinates in a 3-dimensional space by a simple manipulation. The 3-dimensional coordinate specifying device includes a standard plane setting section 22 for setting an optional standard flat plane 31 in a 3-dimensional space, a standard point determining section 23 for determining values of coordinates of an optional point on the set standard flat plane 31, a light beam emitting section 25 for emitting an imaginary light beam 33 at an optional angle from the determined standard point 32, a point specifying section 26 for specifying an optional point on the emitted imaginary light beam, and a coordinate calculating section 27 for calculating 3-dimensional coordinates of the specified point.

13 Claims, 18 Drawing Sheets

(A)

(B)

(C)

(D)

(E)

(A)

(B)

All Points Of Intersection
Being Connected To Each Other (A)

Predetermined Two Sets Of Points
Of Intersection Being
Not Connected To Each Other (B)

Predetermined Two Sets Of Points
Of Intersection Being
Not Connected To Each Other

THREE DIMENSIONAL COORDINATE LOCATION DEVICE, METHOD FOR SAME, AND PROGRAM

TECHNICAL FIELD

The present invention relates to a 3-dimensional coordinate specifying device and so forth for specifying an optional point in 3-dimensional coordinates on a 2-dimensional screen.

BACKGROUND OF ART

When a 3-dimensional figure is designed, using a piece of software such as a CAD or the like, it is impossible to specify an optional point of coordinates in a 3-dimensional space on a 2-dimensional display by manipulating a pointing device such as a mouse or the like. In order to specify an optional point of coordinates in the 3-dimensional space, it is necessary to input values (x, y, z) of a set of coordinates, but an input manipulation is troublesome, and thus a processing is inefficient.

In relation to the aforesaid matter, Patent Document 1 discloses a technique for specifying an optional point in a 3-dimensional space. The technique disclosed Patent Document 1 is directed to 3-dimensional coordinate value inputting method of inputting designation of a position in a 3-dimensional space on a manipulation screen displayed as a 2-dimensional plane. In this method, a flat plane, which is parallel to a X-Y plane, is defined by fixing a value of Z, and is designated as an input-allowable extent, and a flat plane indicating the input-allowable extent is displayed. For example, when a cursor is vertically moved on a 2-dimensional screen, this movement is interpreted as a movement on the aforesaid flat plane, and the cursor is regulated to be moved only on the flat plane by decomposing a vector of the movement into an X component and a Y component. Then, a piece of positional information is input in a direction, which is not fixed, and is acquired as a set of 2-dimensional coordinates which defines a position on the screen. Thus, an X coordinate value and a Y coordinate value of the 3-dimensional coordinates on the aforesaid flat plane are found from the set of 2-dimensional coordinates.

PRIOR ART DOCUMENTS

Patent Documents

Patent Document 1: JP-2003-167924 A

SUMMARY OF THE INVENTION

Problems to be Resolved by the Invention

Nevertheless, in the technique disclosed in Patent Document 1, it is necessary to fix a value of at least one coordinate axis. Also, when a set of coordinate values does not exist on a common flat plan or a common straight line, it is necessary to input a piece of information on a coordinate axis to be fixed. Thus, the technique concerned has a problem that a manipulation is troublesome, and that a working is inefficient.

Further, in a series of manipulations, it is possible to merely specify an optional point on one flat plane or an optional point on one straight line. When sets of coordinates are specified on a plurality of flat planes or a plurality of straight lines, a manipulation is troublesome, and a processing is inefficient.

Therefore, the present invention aims at providing a 3-dimensional coordinate specifying device in which it is possible to accurately specify a set or sets of optional coordinates in a 3-dimensional space by a simple manipulation.

Means for Solving the Problems

A 3-dimensional coordinate specifying device disclosed in the present application is characterized by the fact that the device comprises: a standard plane setting means for setting at least one optional standard flat plane in a 3-dimensional space; a standard point determining means for determining an optional point on the standard flat plane, set by the standard plane setting means, as a standard point; a light beam emitting means for emitting an imaginary light beam at an optional angle from the standard point determined by the standard point determining means; a point specifying means for specifying an optional point on the imaginary light beam emitted by the light beam emitting means; and a coordinate calculating means for calculating 3-dimensional coordinates of the point specified by the point specifying means.

As stated above, in the 3-dimensional coordinate specifying device disclosed in the present application, since the optional point on the imaginary light beam emitted by the light beam emitting means is specified, even if the optional point is displayed on a 2-dimensional display, there are merits or advantages that the 3-dimensional coordinates in the 3-dimensional space can be visually and accurately specified without inputting values of coordinates.

The 3-dimensional coordinate specifying device disclosed in the present application is characterized by the fact that the device further comprises a standard point moving means for moving the standard point, determined by the standard point determining means, on the standard flat plane.

As stated above, in the 3-dimensional coordinate specifying device disclosed in the present application, since the determined standard point is moved on the standard flat plane, there are merits or advantages that, while the standard point concerned is moved on the 2-dimensional standard flat plane by a simple manipulation, using a pointing device such as a mouse or the like, it is possible to freely specify an optional point in 3-dimensional coordinates by the imaginary light beam emitted from the standard point concerned.

The 3-dimensional coordinate specifying device disclosed in the present application is characterized by the fact that a point of intersection, at which the imaginary light beam is intersected with a surface of at least one displaying object displayed in the 3-dimensional space, is specified by the point specifying means.

As stated above, in the 3-dimensional coordinate specifying device disclosed in the present application, the point of intersection, at which the imaginary light beam is intersected with the surface of the at least one displaying object displayed in the 3-dimensional space, is specified by the point specifying means, there are merits or advantages that not only can a set of optional 3-dimensional coordinates on the displaying object already displayed in the 3-dimensional space be easily specified, but also it is possible to efficiently carry out an edition processing of a figure.

The 3-dimensional coordinate specifying device disclosed in the present application is characterized by the fact that a plurality of points of intersection, at which the imaginary light beam is intersected with a surface and/or a line of the displaying object displayed in the 3-dimensional space.

As stated above, in the 3-dimensional coordinate specifying device disclosed in the present application, since the plurality of points of intersection, at which the imaginary light beam is intersected with the surface and/or the line of the displaying object displayed in the 3-dimensional space, there are merits or advantages that it is possible to specify sets of 3-dimensional coordinates on the displaying object by one manipulation, resulting in improvement in operativity of the device.

The 3-dimensional coordinate specifying device disclosed in the present application is characterized by the fact that a plurality of displaying objects are displayed, and that a plurality of points of intersection, at which the imaginary light beam is intersected with surfaces and/or lines of the displaying objects, are specified by said point specifying means.

As stated above, in the 3-dimensional coordinate specifying device disclosed in the present application, since the plurality of displaying objects are displayed, and since the plurality of points of intersection, at which the imaginary light beam is intersected with surfaces and/or lines of the displaying objects, are specified, there are merits or advantages that not only it is possible to specify sets of 3-dimensional coordinates on the displaying objects by one manipulation, but also sets of 3-dimensional coordinates can be specified by making the imaginary light beams to pass through the displaying objects, which are already displayed, regardless of configurations and positions of the displaying objects, resulting in improvement in operativity of the device.

The 3-dimensional coordinate specifying device disclosed in the present application is characterized by the fact that a plurality of optional points are specified by the point specifying means, and that the device further comprises a distance calculating means for calculating a distance among the specified points.

As stated above, in the 3-dimensional coordinate specifying device disclosed in the present application, since the plurality of optional points are specified, and since the distance among the specified points is calculated, there are merits or advantages that it is possible to easily measure a distance in the 3-dimensional space on a 2-dimensional display by a simple manipulation, so that a working can be efficiently carried out.

The 3-dimensional coordinate specifying device disclosed in the present application is characterized by the fact that a plurality of standard flat plane are set by the standard plane setting means, an imaginary light beam being emitted from each of the set standard flat planes by the light beam emitting means, a point of intersection of an imaginary light beam emitted from each of the set standard flat planes being specified by the point specifying means.

As stated above, in the 3-dimensional coordinate specifying device disclosed in the present application, since the plurality of standard flat plane are set, since the imaginary light beam is emitted from each of the set standard flat planes, and the point of intersection of the emitted imaginary light beam is specified, there are merits or advantages that it is possible to freely specify an optional point of 3-dimensional coordinates by utilizing the imaginary light beams.

The 3-dimensional coordinate specifying device disclosed in the present application is characterized by the fact that points of intersection of the imaginary light beams emitted from the respective set standard flat planes are specified by the point specifying means, the device further comprising a drawing means for drawing a line and a planes based on the specified points of intersection.

As stated above, in the 3-dimensional coordinate specifying device disclosed in the present application, since the points of intersection of the imaginary light beams emitted from the respective set standard flat planes are specified, and since the line and the planes are drawn based on the specified points of intersection, there are merits or advantages that it is possible to freely draw a figure in the 3-dimensional space.

The 3-dimensional coordinate specifying device disclosed in the present application is characterized by the fact that the imaginary light beams emitted from the standard flat planes are set so as to be non-parallel to each other, and that a standard point, from which one of the imaginary light beams is emitted, is determined, and a standard point, from which another of the imaginary light beams is emitted, is determined, the standard point concerning the other imaginary light beam being moved in a direction of an optional axis passing through the standard point concerned, on that the other imaginary light beam is intersected with the one of the imaginary light beams, so that the point of intersection of the imaginary light beams is specified.

As stated above, in the 3-dimensional coordinate specifying device disclosed in the present application, since the imaginary light beams emitted from the standard flat planes are set so as to be non-parallel to each other, and since, when the other imaginary light beam is emitted after the one imaginary light beam is emitted, the standard point concerning the other imaginary light beams is moved in the direction of the optional axis passing through the standard point concerned, so that the other imaginary light beam is intersected with the one of the imaginary light beams to specify the point of intersection of the imaginary light beams, there are merits or advantages that it is possible to specify the point of intersection, at which the one imaginary light beam is intersected with the other imaginary light beam, without carrying out a complex manipulation, with reflecting a position of a standard point set by a user.

The 3-dimensional coordinate specifying device disclosed in the present application is characterized by the fact that the standard flat planes are non-parallel to each other, the imaginary light beams emitted from each of the standard flat planes being perpendicular to the standard flat plane concerned; and that a standard point, from which one of the imaginary light beams is emitted, is determined, and a standard point, from which another of the imaginary light beams is emitted, is determined, the standard point concerning the other imaginary light beam being moved in a direction of an axis passing through the standard point concerned and defined as an axis of intersection by the standard flat planes, so that the point of intersection of the imaginary light beams is specified.

As stated above, in the 3-dimensional coordinate specifying device disclosed in the present application, since the standard flat planes are non-parallel to each other, since the imaginary light beam emitted from each of the standard flat planes is perpendicular to the standard flat plane concerned, and since, when the other imaginary light beam is emitted after the one imaginary light beam is emitted, the standard point concerning the other imaginary light beams is moved in the direction of the axis passing through the standard point concerned and defined as the axis of intersection by the standard flat planes, so as to specify the point of intersection of the imaginary light beams, there are merits or advantages that it is possible to specify the point of intersection, at which the one imaginary light beam is intersected with the other imaginary light beam, without carrying out a complex manipulation, with reflecting a position of a standard point set by a user The 3-dimensional coordinate specifying device disclosed in the present application is characterized by the fact that, when the standard point concerning the one of the imaginary light beams is moved, and when the point of intersection, at which the one of the imaginary light beams is intersected with the other imaginary light beam, is moved, the standard point concerning the other imaginary light beam is moved so as to follow the point of intersection while maintaining the angle defined by the other imaginary light beam and the standard flat plane concerning the other imaginary light beam.

As stated above, in the 3-dimensional coordinate specifying device disclosed in the present application, since, when the standard point concerning the one of the imaginary light beams is moved, and when the point of intersection, at which the one of the imaginary light beams is intersected with the other imaginary light beam, is moved, the standard point concerning the other imaginary light beam is moved so as to follow the point of intersection while maintaining the angle defined by the other imaginary light beam and the standard flat plane concerning the other imaginary light beam, there are merits or advantages that the point of intersection is maintained at a state in which it can be always specified, whereby not only can a standard point be intuitively moved by the user, but also it is possible to specify a 3-dimensional coordinates by a simple manipulation.

In the foregoing, although the present invention is referred to as the device, it should be understood by those who are skillful in the art that the present invention may be defined as a method and a program.

BRIEF EXPLANATIONS OF DRAWINGS

FIG. 11 is a functional block diagram 3-dimensional coordinate specifying device according to a third embodiment.

MODES FOR EMBODYING THE INVENTION

Embodiments of the present invention will now be explained below. It is possible to embody the present invention in many various modes. Thus, the present invention should not be interpreted by only descriptions on the embodiments of the present invention. Also, in the embodiments, the elements similar to each other are indicated by the same references.

In the embodiments mentioned below, although reference is mainly made to a device, it is possible to embody the present invention in a method and a program for operating a computer. Also, it is possible to embody the present invention in hardware and software or a hardware mode and a software mode. The program may be stored in a hard disk, a CD-ROM, DVD-ROM, an optical memory device, a magnetic memory device or the like. Further, the program may be stored in another computer through a network.

First Embodiment of the Invention

With reference to FIGS. 1 to 7, a 3-dimensional coordinate specifying device according to this embodiment will now be explained below.

Figure 1:
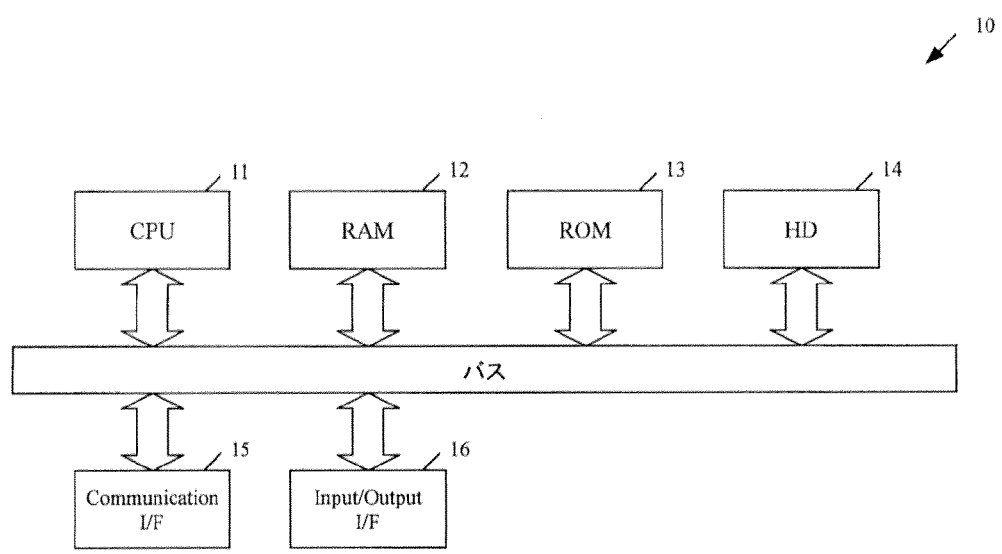
FIG. 1 is a hardware arrangement diagram of a 3-dimensional coordinate specifying device according to a first embodiment.

FIG. 1 is a hardware arrangement diagram of the 3-dimensional coordinate specifying device according to this embodiment. The 3-dimensional coordinate specifying device 10 includes a CPU 11, a RAM 12, a ROM 13, a hard disk (referred to as HD hereinafter) 14, a communication I/F 15 and an input/output I/F 16. The ROM 13 and the HD 14 store operating systems and various programs (for example, CAD programs, 3-dimensional coordinate determination programs and so forth), and they are read therefrom to the RAM 12, if necessary, so that the read programs are executed by the CPU 11.

The communication I/F 15 is an interface to make communicate with another device ((or example, a server, an upper tank device and so forth). The input/output I/F 16 is an interface for inputting data from an inputting device such as a keyboard, a mouse and so forth and for outputting data to a printer, a monitor and so forth. Also, if necessary, the input/output I/F 16 may be connected to a driver corresponding to a removal disk such as an optical disk, a Floppy Disk (Registered Trademark), a CD-ROM, a DVD-ROM or the like. The processing sections are connected to each other via buses so that information data are given and took between the processing sections.

Figure 2:
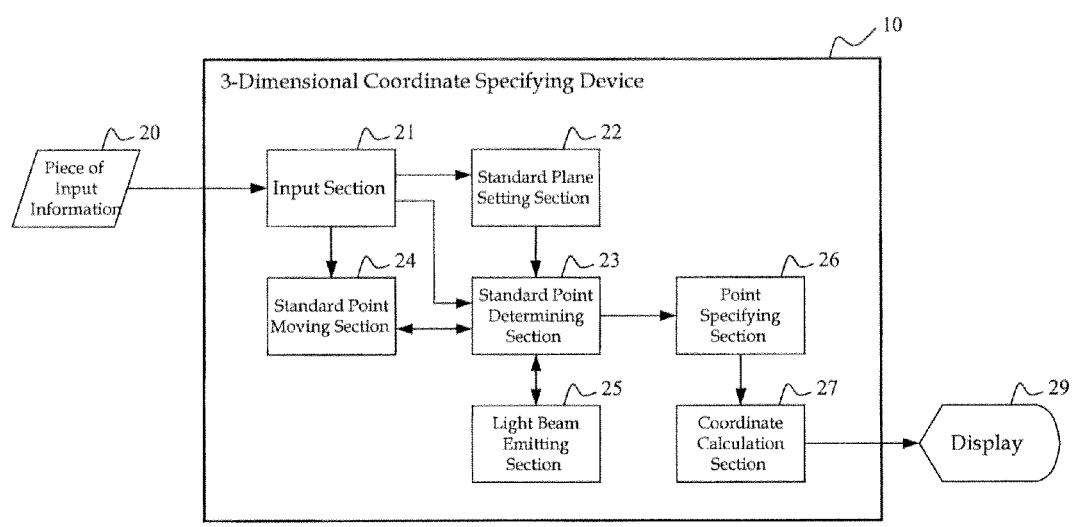
FIG. 2 is a functional block diagram of the 3-dimensional coordinate specifying device according to the first embodiment.

FIG. 2 is a functional block diagram of the 3-dimensional coordinate specifying device according to this embodiment. The 3-dimensional coordinate specifying device 10 is provided with an input section 21 for inputting a piece of input information 20 from a user, a standard plane setting section 22 for setting an optional standard flat plane in a 3-dimensional space, a standard point moving section 24 for moving an optional point (i.e., a standard point) which is set on the standard flat plane by the standard plane setting section 22 based on the piece of input information 20 from the user, a light beam emitting section 25 for making an imaginary light beam emit from the standard point at an optional angle, a standard point determining section 23 for determining a position of the standard point based on the piece of input information 20 from the user, a point specifying section 26 for specifying an optional point on the imaginary light beam emitted from the light beam emitting section 25, and a coordinate calculating section 27 for calculating 3-dimensional coordinates of the point which is specified by the point specifying section 26.

A coordinate point, which is defined by the 3-dimensional coordinates calculated by the coordinate calculating section 27, and values of the 3-dimensional coordinates are displayed on a 2-dimensional display 29, and thus it is possible for the user to visually recognize the coordinate point and the values of the 3-dimensional coordinates.

Figure 3:
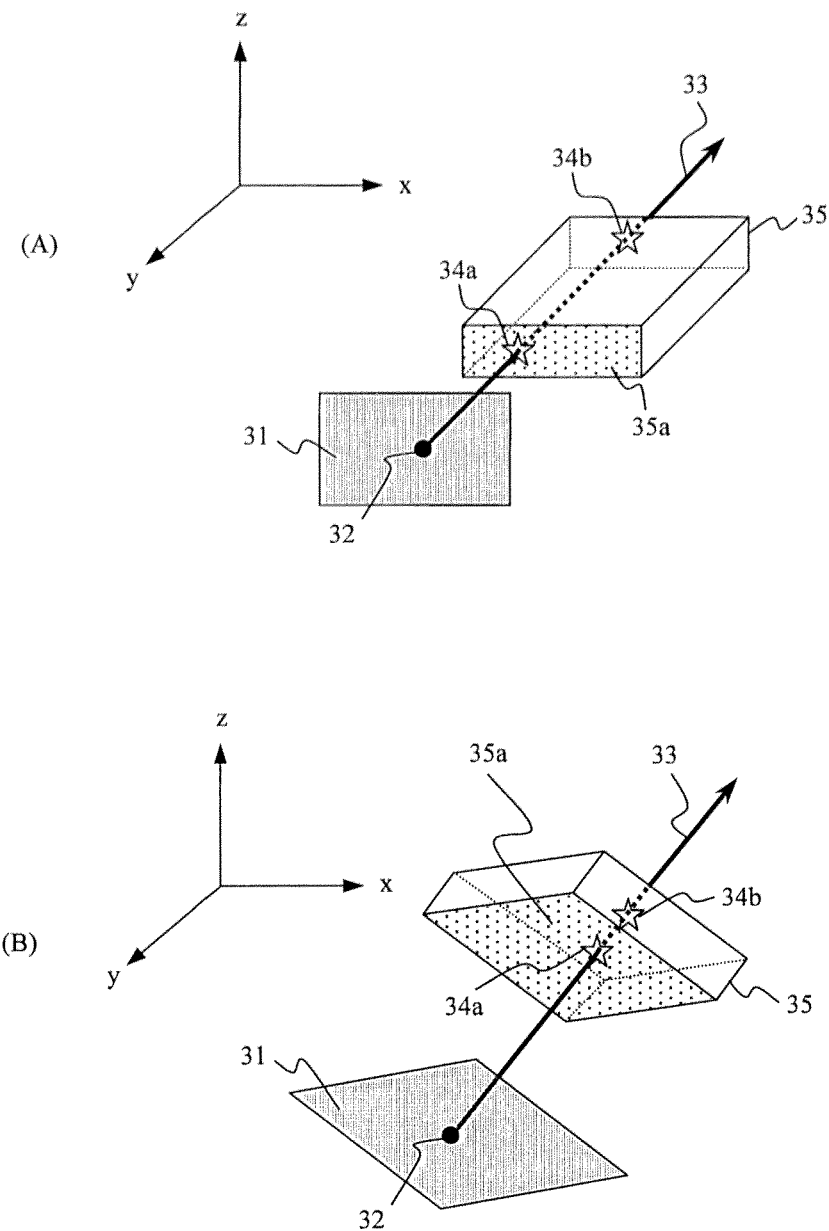
FIG. 3 is first views showing processes for specifying coordinate points in the 3-dimensional coordinate specifying device according to the first embodiment.

Next, reference is made in details to a process for specifying 3-dimensional coordinates on the 2-dimensional displays. FIG. 3 are first views showing processes for specifying coordinate points in the 3-dimensional coordinate specifying device according to this embodiment. FIG. 3(A) illustrates a displaying object 35 having at least one flat surface, and a process for specifying an optional point on the displaying object 35. Is shown the displaying object 35 having a flat surface which is parallel to and/or perpendicular to at least one of three coordinate axes (an x-axis, a y-axis and a z-axis), and an optional flat plane, which is parallel to a flat surface of the displaying object 35 (which may be defined as an object flat surface 35a shown in FIG. 3(A)), is set as a standard flat plane 31 based on the object flat surface 35a.

After the standard flat plane 31 is set, while an imaginary light beam 33 is emitted from an optional standard point 32 on the standard flat plane 31, the optional standard point 32 is moved until a target coordinate point is irradiated with the imaginary light beam 33. Note, although an angle defined between the standard flat plane 31 and the imaginary light beam 33 emitted from the standard point 32 may be optionally set by designation of the user, it is desirable to set such an angle at a fixed angle (for example, 90 degrees) due to the fact that it is possible to easily carry out a calculation of values of coordinates, a determination of a standard point and a manipulation.

When the emitted imaginary light beam 33 is directed to the displaying object 35, it is reflected on a surface of the displaying object so that a point 34a of intersection is specified. In this case, if the displaying object 35 is transparent, the imaginary light beam passes through the displaying object 35 so that another point 34b of intersection is specified. In short, by moving the standard point 32 on the standard flat plane 31, points of intersection are specified between the imaginary light beam 33 and the displaying object, so that it is possible to recognize coordinates on a flat surface of the displaying object 35.

In the case of FIG. 3(B), similarly, although an optional point on a displaying object 35 is specified, it is different from the case of FIG. 3(A) in that the displaying object 35 has no surfaces which are parallel to and/or perpendicular to any of the three coordinate axes. In even this case, based on an object flat surface 35a of the displaying object 35, a standard flat plane 31, which is parallel to the object flat surface 35a, is set. After the standard flat plane 31 is set, similar to the case of FIG. 3(A), while an imaginary light beam 33 is emitted from a standard point 32, the standard point 32 is positioned at a target coordinate point, so that points 34a and 34b of intersection on the displaying object 35 are specified.

Note, as shown in FIG. 3, when each of the displaying objects 35 has the plurality of flat surfaces, any one of the flat surfaces may be defined as the object flat surface 35a, and the 3-dimensional coordinate specifying device may include a function of notifying the user of a flat surface proposed for the object flat surface 35a by displaying it in a different color or by flashing it on and off.

Also, it may be optionally selected by the user whether or not the displaying object 35 is transparent. When the displaying object 35 is not transparent, only the points 34a of intersection shown in FIG. 3 are specified. When the displaying object 35 is transparent, the points 34a of intersection and the points 34b of intersection shown in FIG. 3 may be specified.

Further, in the 3-dimensional coordinate specifying device, when the object flat surface 35a is set, the setting of the standard flat plane 31 may be automatically carried out so that a flat plane, which is parallel to the object flat surface 35a, and which is spaced from the object flat surface 35a by a given distance (which is predetermined as a piece of setting information), is defined as the standard flat plane 31. Alternatively, the user may manually set the standard flat plane 31 at an optional position by using a mouse or the like.

Figure 4:
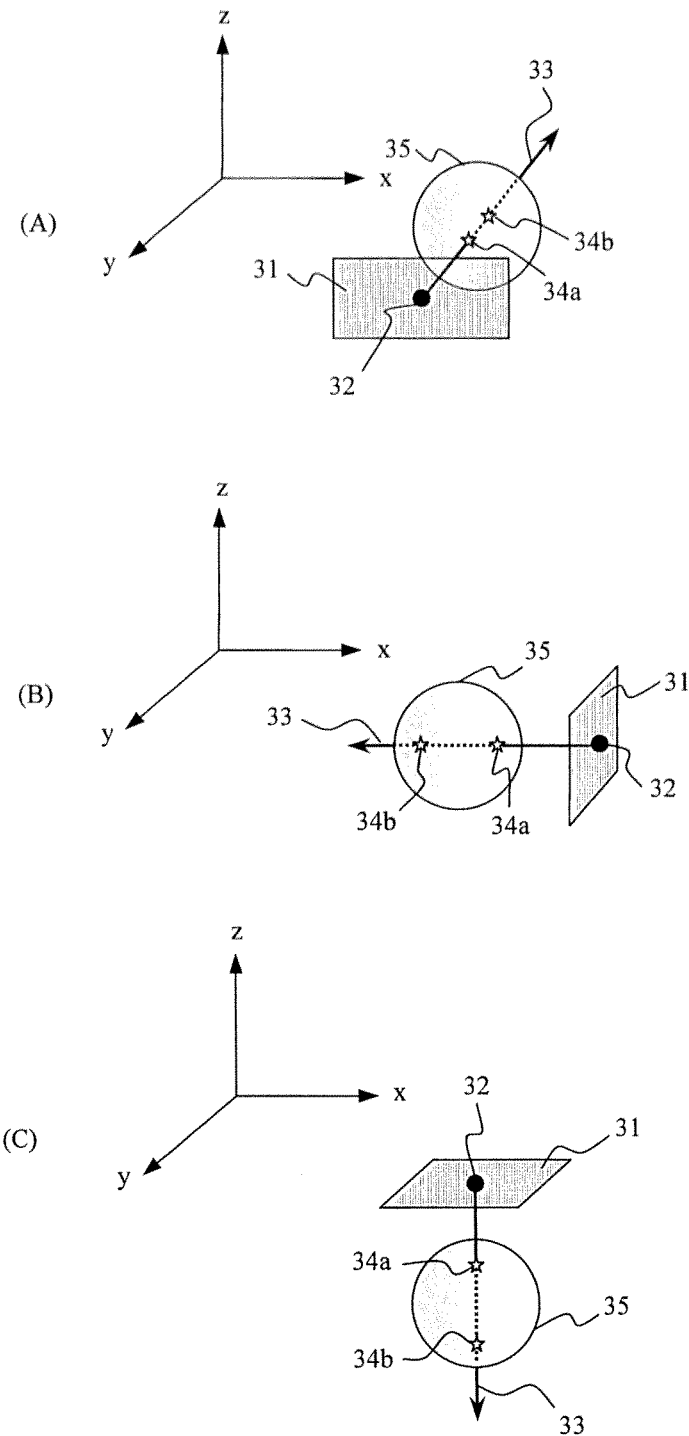
FIG. 4 is second views showing processes for specifying coordinate points in the 3-dimensional coordinate specifying device according to the first embodiment.

FIG. 4 is second views showing processes for specifying coordinate points in the 3-dimensional coordinate specifying device according to this embodiment. In this embodiment, reference is made to a setting of a standard flat plane 31 in a case where a displaying object 35 has no flat surface so that an object flat surface 35a cannot be specified. As shown in FIG. 4, in a case where the displaying object 35 has no flat surface, since the object flat surface 35a cannot be specified, a flat plane, which is parallel to and/or perpendicular to any one of the three coordinate axes, is set as the standard flat plane 31. FIG. 4(A) is a view showing a case where the standard flat plane 31 is set so as to be parallel to the x-axis and the z-axis (the x-z plane) and perpendicular to the y-axis; FIG. 4(B) is a view showing a case where the standard flat plane 31 is set so as to be parallel to the y-axis and the z-axis (the y-z plane) and perpendicular to the x-axis; and FIG. 4(C) is a view showing a case where the standard flat plane 31 is set so as to be parallel to the x-axis and the y-axis (the x-y plane) and perpendicular to the z-axis.

As stated above, due to the setting of the standard flat plane 31 which is parallel to and/or perpendicular to a coordinate axis and a coordinate plane, not only can coordinate values of points 34a and 34b of intersection be easily calculated, but also it is possible to easily present the user with notification, determination and so forth on a flat plane proposed for the standard flat plane, which are carried out in the 3-dimensional coordinate specifying device.

Note that the user may manually set the standard flat plane 31a an optional position by using a mouse or the like. Also, similar to the case of FIG. 3. it may be optionally selected by the user whether or not the displaying object 35 is transparent.

Figure 5:
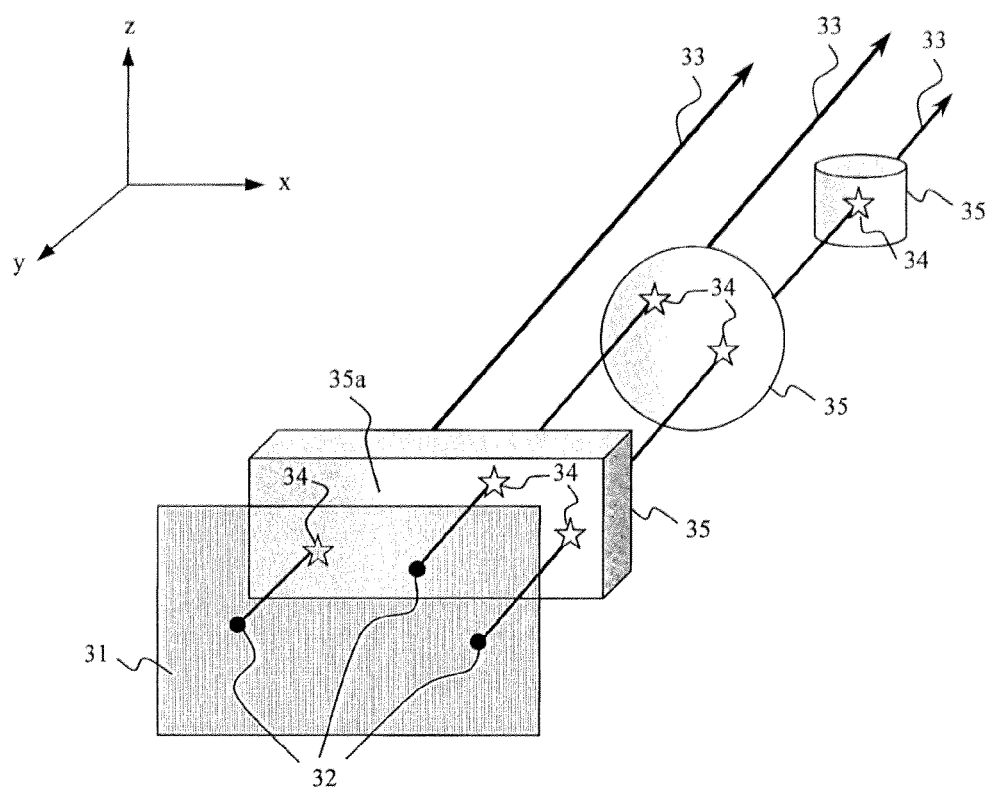
FIG. 5 is a third view showing a process for specifying coordinate points in the 3-dimensional coordinate specifying device according to the first embodiment.

FIG. 5 is a third view showing a process for specifying a coordinate point in the 3-dimensional coordinate specifying device according to this embodiment. In this embodiment, some imaginary light beams 33 are emitted to a plurality of displaying objects 35. As shown in FIG. 5, when the imaginary light beams 33 passes through the plurality of displaying objects 35, it is possible to specify points 34 of intersection on the imaginary light beams 33 to the plurality of displaying objects 35.

Note, in spite of the fact that the displaying objects 35 is transparent or not, the imaginary light beams 33 may penetrate the displaying objects 35. Also, the emission of the imaginary light beams 33 may be limited in distance. For example, the emission of the imaginary light beams 33 may be set so that the light beams reach the spherical displaying object shown in FIG. 5, but they do not reach the cylindrical displaying object.

Further, similar to the cases of FIGS. 3 and 4, when the displaying objects 35 are set so as to be transparent, it is possible to specify points which is positioned on rear surfaces of the displaying objects, and through which the imaginary light beams 33 pass outside of the displaying objects.

Furthermore, a single standard point 32 may be moved on the standard flat plane 31 or the plurality of standard points 32 may be simultaneously set on the standard flat plane, as shown in FIG. 5.

Figure 6:
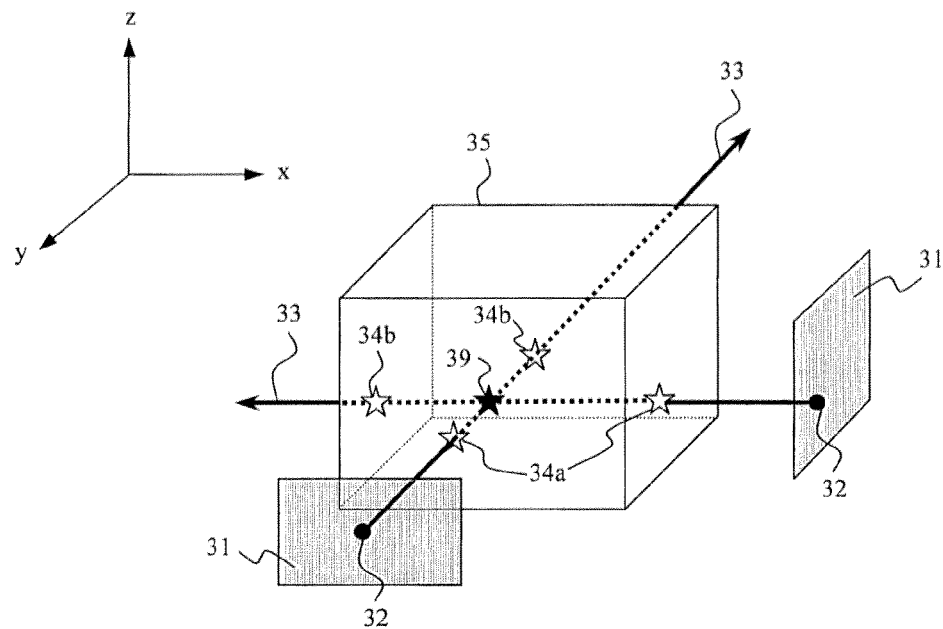
FIG. 6 is a fourth view showing a process for specifying coordinate points in the 3-dimensional coordinate specifying device according to the first embodiment.

FIG. 6 is a fourth view showing a process for specifying a coordinate point the 3-dimensional coordinate specifying device according to this embodiment. In this embodiment, is show a processing case where a point 39 of intersection, which is defined by a plurality of imaginary light beams 33 emitted from a plurality of standard flat planes 31, is specified. In the cases of FIGS. 3 to 5, although a reflection point of an imaginary light beam 33 on a surface of a displaying object 35 is specified as a point 34 of intersection, in this embodiment, an optional point, which exists in an interior or an exterior of a displaying object 35, is specified as the point 39 defined by the imaginary light beam 33. Thus, by specifying the point 39 of intersection defined by the plurality of imaginary light beams 33 emitted from the plurality of optional standard flat planes 31, it is possible to easily specify an optional point to all of the coordinates in the space. A figure drawing process, which utilizes the specification of the point 39 of intersection, will be explained in details in a third embodiment.

Note, as shown in FIG. 6, the plurality of standard planes 31 may be set as flat planes which are parallel to flat object surfaces of the displaying object 35 or which are parallel to and/or perpendicular to coordinate axes. Alternatively, the standard planes may be set at optional positions by using a mouse or the like.

Also, in the case shown in FIG. 6, when the point 39 of intersection defined by the imaginary light beams 33 is specified, the standard points 32 are moved on the respective standard flat planes 31 so that a position of the point 39 of intersection is specified. Nevertheless, when the imaginary light beams 33 are made close to each other by at least a certain distance, the imaginary light beams 33 may be considered to be intersected with each other, and thus positions on the respective imaginary light beams or a position on one of the imaginary light beams may be approximately specified as the point 39 of intersection. In short, the point 39 of intersection is not necessarily specified only when the imaginary light beams 33 are intersected with each other, and the point 39 of intersection may be specified when the imaginary light beams 33 are made close to each other by at least the certain distance. Also, a concrete process for finding a point of intersection defined by a plurality of imaginary light beams will be explained in detail in a fourth embodiment.

Figure 7:
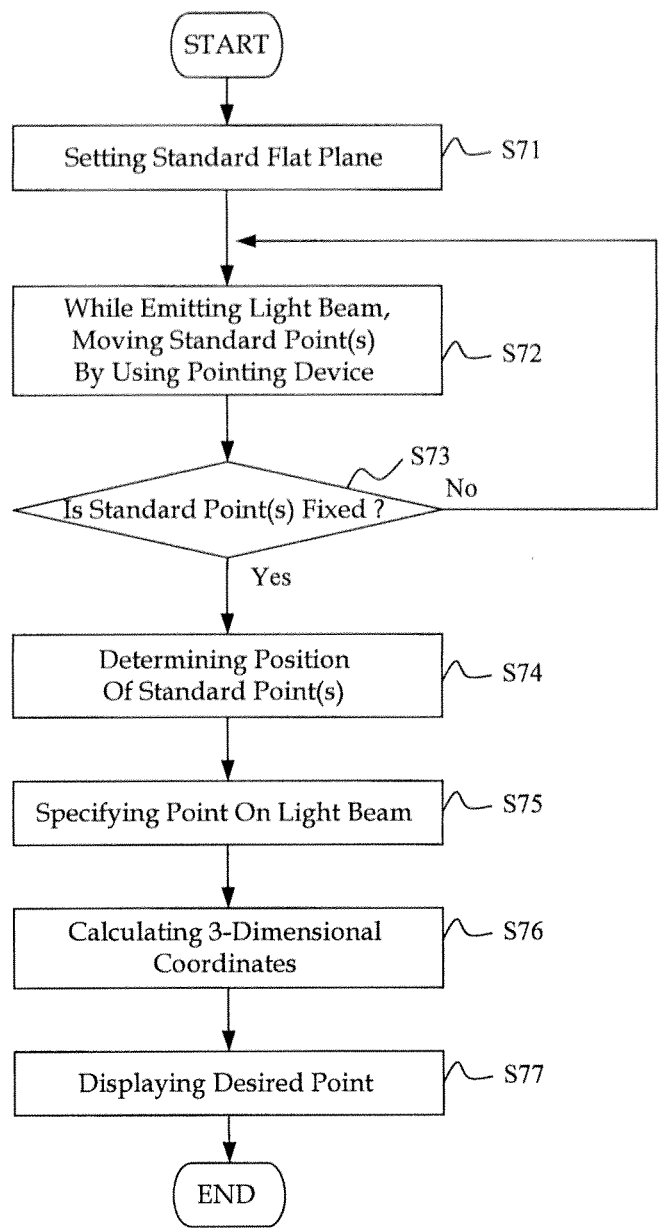
FIG. 7 is a flowchart showing an operation of the 3-dimensional coordinate specifying device according to the first embodiment.

Next, an operation of the 3-dimensional coordinate specifying device according to this embodiment will now be explained. FIG. 7 is a flowchart showing the operation of the 3-dimensional coordinate specifying device according to this embodiment. First, pieces of information on a configuration of a displaying object, a manipulation of a user and so forth are input to the input section 21, and one or plural standard flat planes are set by the standard plane setting section 22 based on the input pieces of information (S71). While one or plural imaginary light beams are emitted from one or plural standard points on the set standard flat plane(s) by the light beam emitting section 25, the standard point(s) is moved by the standard point moving section 24 based on a piece of indication information from the user utilizing a pointing device such as a mouse or the like (S72). It is determined whether the standard point(s) is fixed (S73). In short, it is determined by the user whether a target coordinate point is irradiated with the imaginary light beam(s). If the target coordinate point is not irradiated with the imaginary light beam(s), a position(s) of the standard point(s) is not fixed. If the target coordinate point is irradiated with the imaginary light beam(s), the position(s) of the standard point(s) is fixed.

When the position(s) of the standard point(s) is not fixed, the routine returns to step S72, and thus the movement of the standard point(s) is continuously controlled. When the position(s) of the standard point(s) is fixed, the standard point(s) is determined by the standard point determining section 23 at the fixed position(s) thereof (S74). A point of intersection, which is defined by the displaying object 35 and the imaginary light beam emitted from the one standard point or a point of intersection, which is defined by the plural imaginary light beams emitted from the respective plural standard points, is specified by the point specifying section 26 (S75). 3-dimensional coordinates of the specified point of intersection are calculated by the coordinate calculating section 27 (S76), and a desired piece of information on the calculated 3-dimensional coordinates is displayed on a 2-dimensional screen of the display 29 (S77). Thus, the routine ends.

Second Embodiment of the Invention

Figure 8:
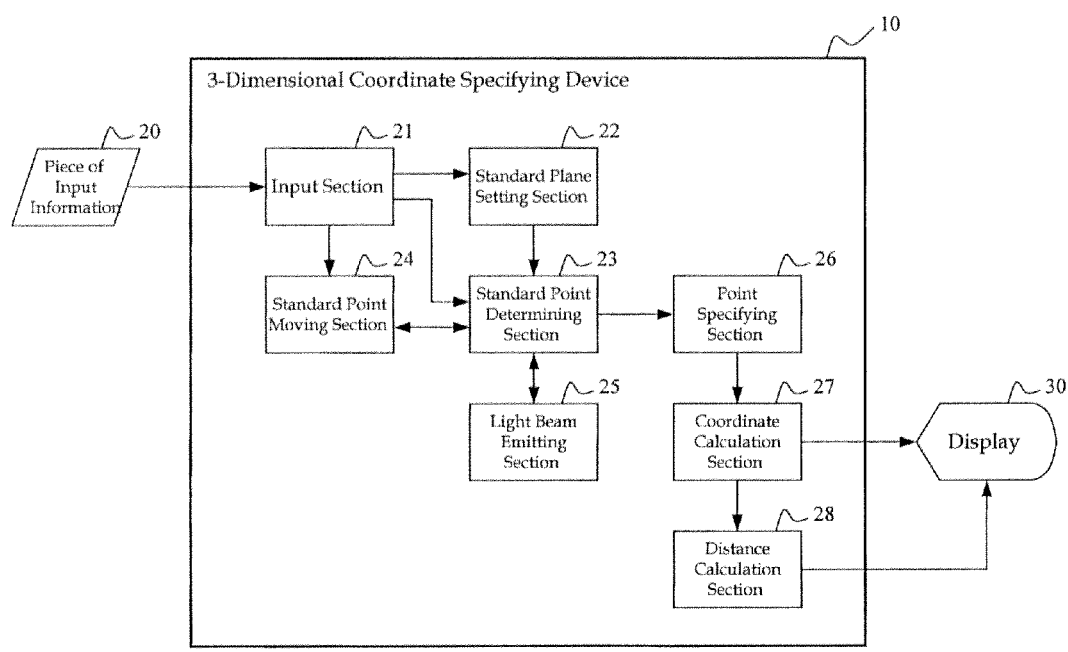
FIG. 8 is a functional block diagram of a 3-dimensional coordinate specifying device according to a second embodiment.
Figure 9:
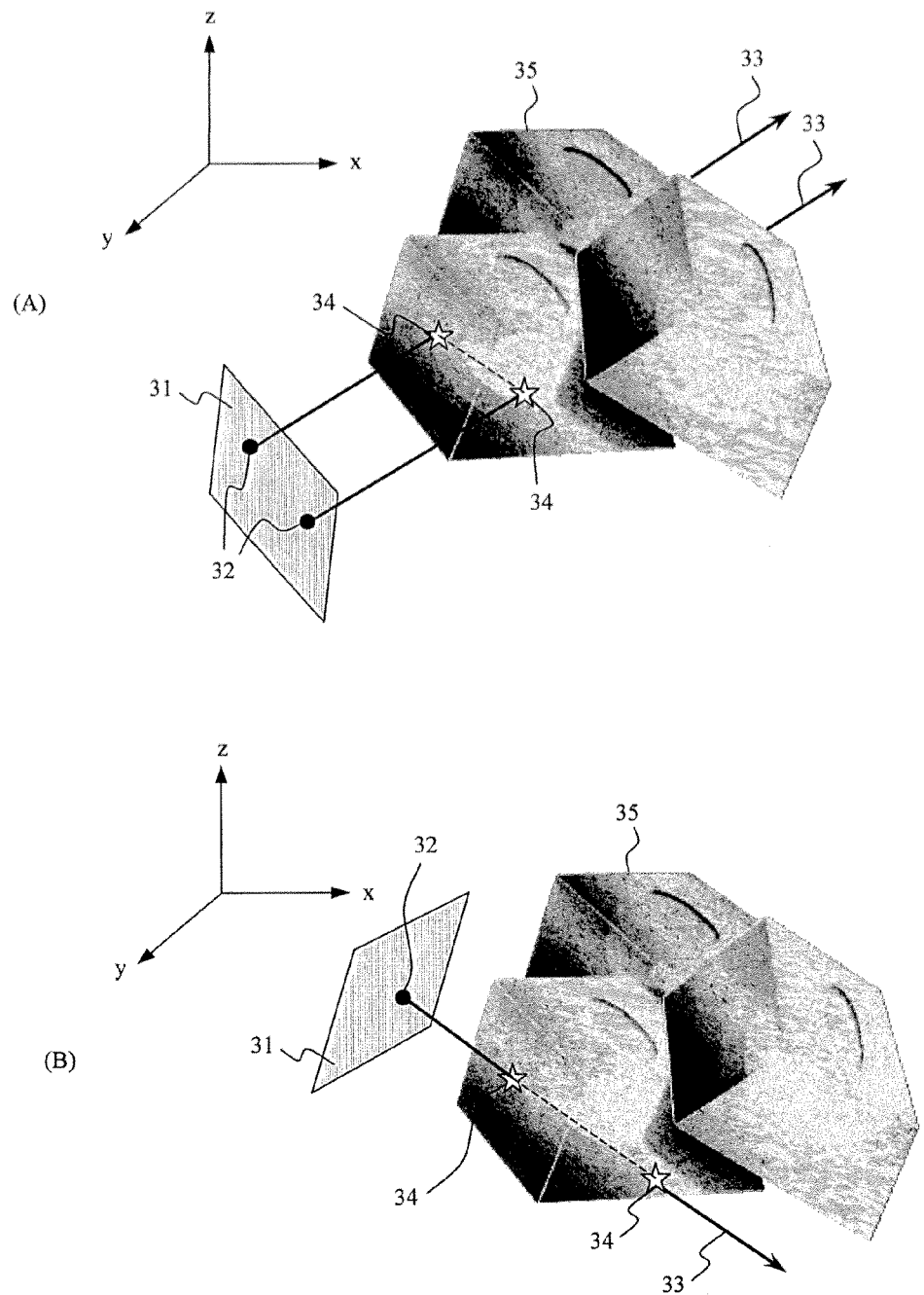
FIG. 9 is views showing processes for measuring a distance between points in the 3-dimensional coordinate specifying device according to the second embodiment.
Figure 10:
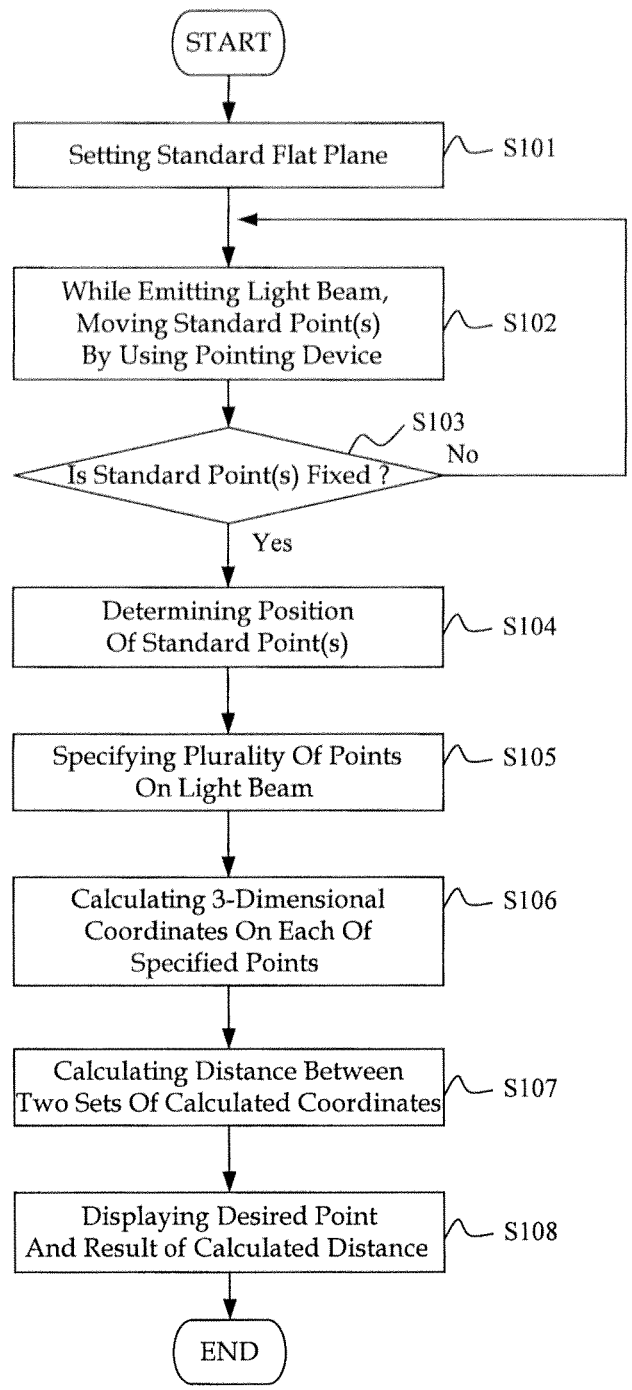
FIG. 10 is a flowchart showing an operation of the 3-dimensional coordinate specifying device according to the second embodiment.

With reference to FIGS. 8 to 10, a 3-dimensional coordinate specifying device according to this embodiment will now be explained below. Note, in the description of the 3-dimensional coordinate specifying device according to this embodiment, the repetition of the same in the aforesaid first embodiment is omitted.

FIG. 8 is a functional block diagram of the 3-dimensional coordinate specifying device according to this embodiment. An arrangement of this embodiment is different from that of the first embodiment of FIG. 2 in that the former is further provided with a distance calculation section 28. When a plurality of points are specified by a point specifying section 26, and when respective sets of coordinates of the specified points are calculated by a coordinate calculating section 27, a distance between optional two sets of coordinates is calculated by the distance calculation section 28.

With reference to FIG. 9, the measurement between the points will be explained. FIG. 9 is views showing processes for measuring a distance between points in the 3-dimensional coordinate specifying device according to this embodiment. FIG. 9(A) shows a case where a distance is measured between two points 34 of intersection defined by a displaying object 35 and respective imaginary light beams 33 emitted from two standard points 32, and FIG. 9(B) shows a case where a distance is measured between two points 34 of intersection defined a displaying object 35 and an imaginary light beam 33 emitted from one standard point 32.

As stated above, not only can distances of various portions of the displaying object 35 be accurately calculated by specifying a plurality of points, but also it is possible to easily measure two optional points in a 3-dimensional space on a 2-dimensional display.

Next, an operation will be explained. FIG. 10 is a flowchart showing the operation of the 3-dimensional coordinate specifying device according to this embodiment. An explanation on steps S101 to S104 is omitted because the processing executed by steps S101 to S104 are the same as those executed by steps S71 to S74 (FIG. 7). At step S104, when a position(s) of standard point(s) is determined, a plurality of points are specified on the imaginary light beam(s) by the point specifying section 26 (S105). Thus, a distance between the specified points is measured. That is, 3-dimensional coordinates of each of the specified points is calculated by the coordinate calculating section 27 (S106), and a distance between the two sets of coordinates is calculated the distance calculating section 28 (S107). The desired piece of 3-dimensional coordinate information and the result of the calculated distance are displayed (108), and the routine ends.

Third Embodiment of the Invention

With reference to FIGS. 11 to 14, a 3-dimensional coordinate specifying device according to this embodiment will now be explained below. Note, in the description of the 3-dimensional coordinate specifying device according to this embodiment, the repetition of the same in the aforesaid first and second embodiments is omitted.

Figure 11:
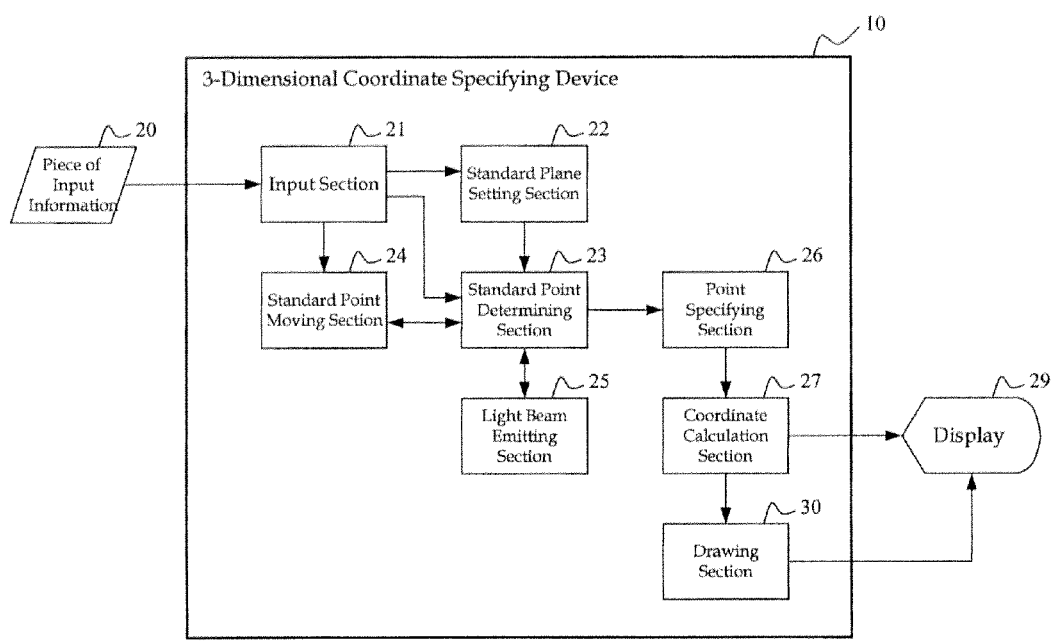
FIG. 11 is

FIG. 11 is a functional block diagram of the 3-dimensional coordinate specifying device according to this embodiment. An arrangement of this embodiment is different from that of the first embodiment of FIG. 2 in that the former is further provided with a drawing section 30. When points are specified by a point specifying section 26, and which coordinates of each of the specified points are calculated by a coordinate calculating section 27, these points are connected to each other by the drawing section 30 so that lines, planes and 3-dimensional bodies are drawn.

Figure 12:
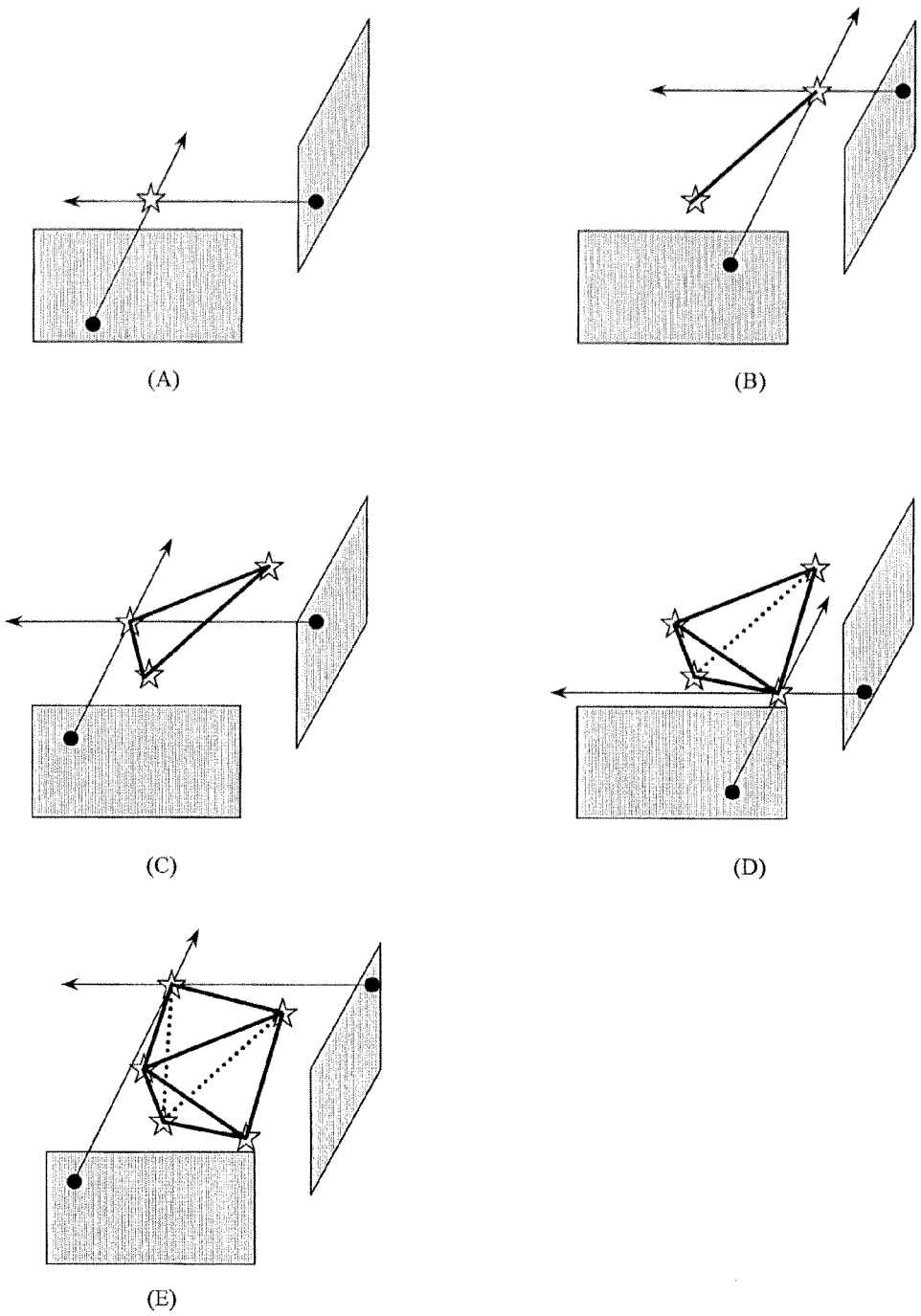
FIG. 12 is views showing drawing processes which are carried out in the 3-dimensional coordinate specifying device according to the third embodiment.

Referring to FIG. 12, a drawing process will be explained. FIG. 12 is views showing drawing processes which are carried out in the 3-dimensional coordinate specifying device according to this embodiment. In FIG. 12(A), a point of intersection, which is defined by a set of two imaginary light beams, is specified and determined. Thereafter, as shown in FIG. 12(B) to FIG. (E), points of intersection, which are defined by respective sets of two imaginary light beams, are specified one and after, and these points are connected to each other so that lines, planes and 3-dimensional bodies are drawn, as shown in FIG. 12.

Figure 13:
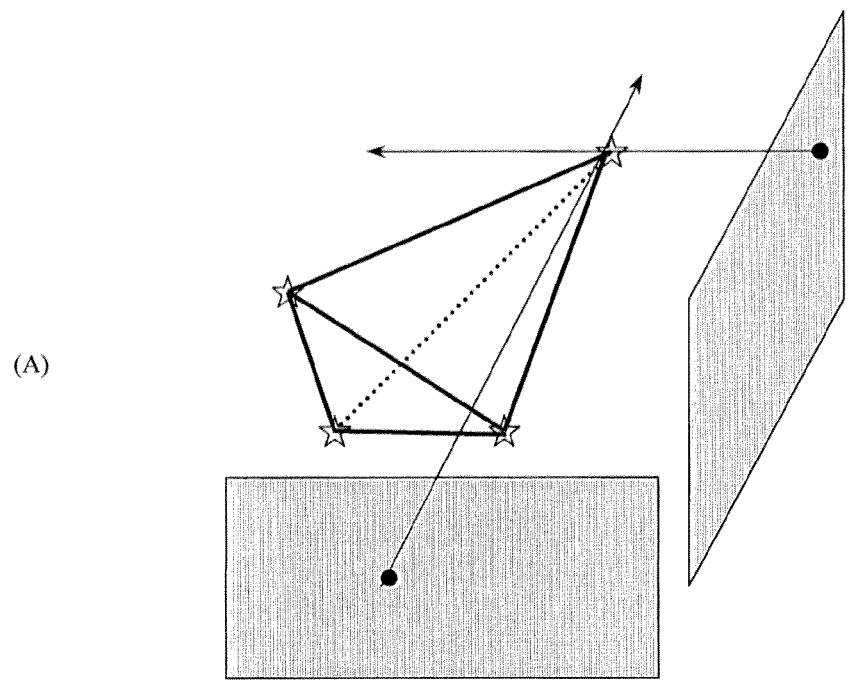
FIG. 13 is views showing examples of processing a drawn figure in the 3-dimensional coordinate specifying device according to the third embodiment.
Figure 13:
Figure 13:
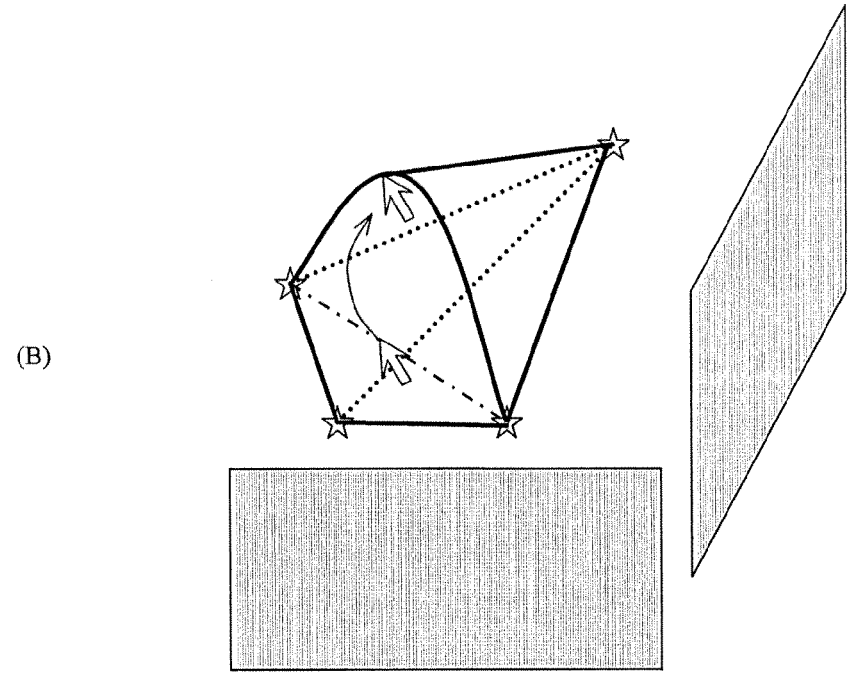

Note that a drawn line and a drawn plane can be processed by using a function with which a CAD software program is generally provided. For example, it is possible to process the drawn line and the drawn plane into a curved line and a curved plane. In this, an example of processing a figure is shown in FIG. 13. FIG. 13(A) shows the figure before it is processed, and FIG. (B) shows the figure after it is processed. In a case where a proximal side of a triangular pyramid shown as the figure in FIG. 13(A) is processed into a curved side, a point on the proximal side is set by using a pointing device such as a mouse or the like, and then the mouse is dragged to a desired position, whereby the figure can be processed. Like this, after the basic figure as shown in FIG. 13(A) is drawn, it is possible edit it by using an existing software program.

Figure 14:
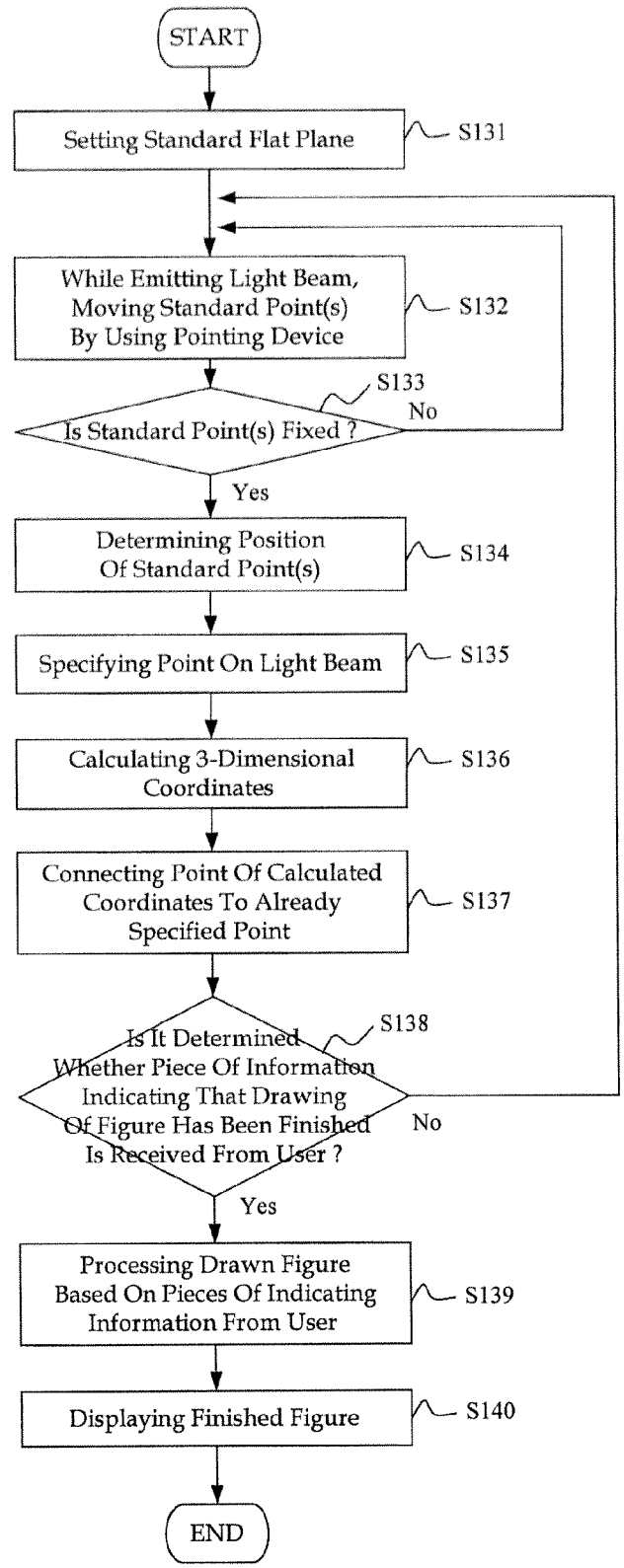
FIG. 14 is a flowchart showing an operation of the 3-dimensional coordinate specifying device according to the third embodiment.

Next, an operation will be explained. FIG. 14 is a flowchart showing the operation of the 3-dimensional coordinate specifying device according to this embodiment. An explanation on steps S131 to S136 is omitted because the processing executed by steps S131 to S136 are the same as those executed by steps S71 to S76 (FIG. 7). As step S136, when 3-dimensional coordinates of a specified point of intersection are calculated by a coordinate calculating section 27, a point of the calculated coordinates is connected to a point which is already specified by the drawing section 30, or an optional one selected from points which are already specified by the drawing section 30 (S137). It is determined whether a piece of information indicating that a drawing of a figure has been finished is received from the user (S138). If there is not the piece of information indicating that the drawing of the figure has been finished, the routine returns to step S132, the processing for further specifying 3-dimensional coordinates is repeated. If there is the piece of information indicating that the drawing of the figure has been finished, the drawn figure is processed based on pieces of indicating information (i.e., figure processing information) received from the user (S139). When the processing of the figure has been finished, the finished figure is displayed on the 2-dimensional display (140), and the routine ends.

Figure 15:
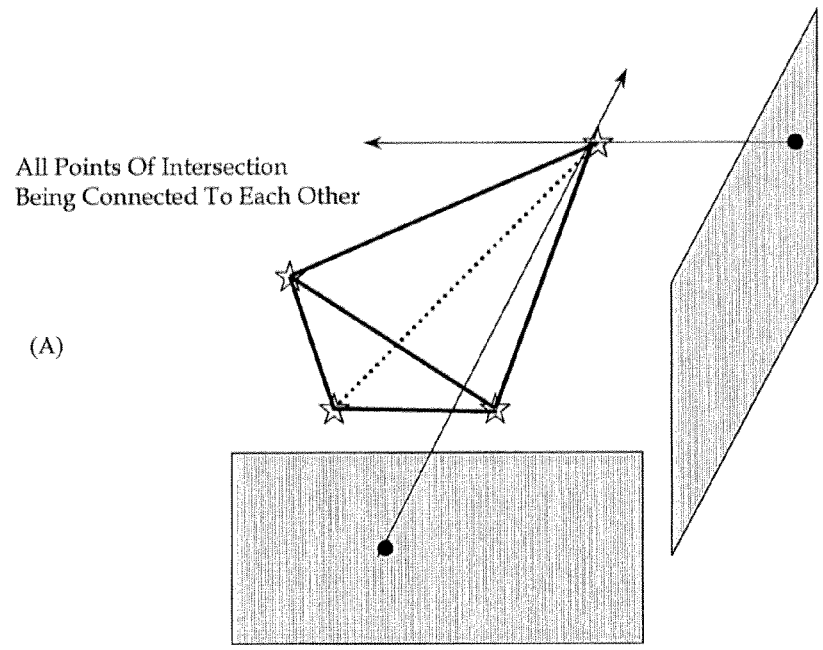
FIG. 15 is second views showing drawing processes which are carried out in the 3-dimensional coordinate specifying device according to the third embodiment.
Figure 15:
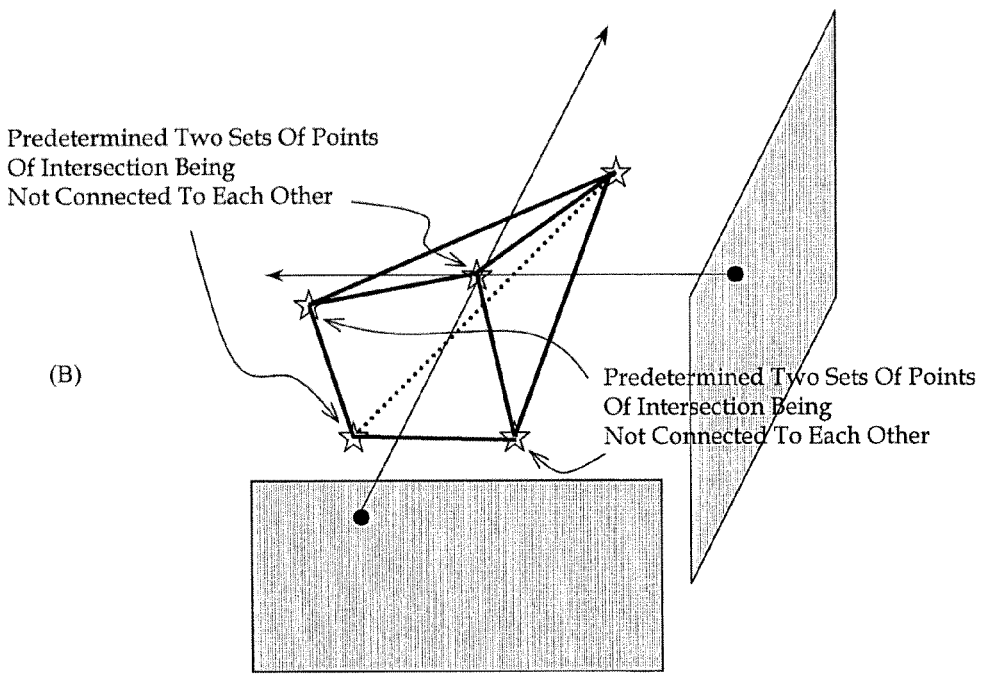

Note that it is determined based on indications from the user how the specified points are connected to each other. That is, as shown in FIG. 15, for example, a figure such as a triangular pyramid, in which all of the points of intersection are connected to each other, may be drawn, and a figure such as a quadrangular pyramid, in which predetermined two sets of points of intersection on the bottom of the quadrangular pyramid are not connected to each other, may be drawn.

Fourth Embodiment of the Invention

Figure 16:
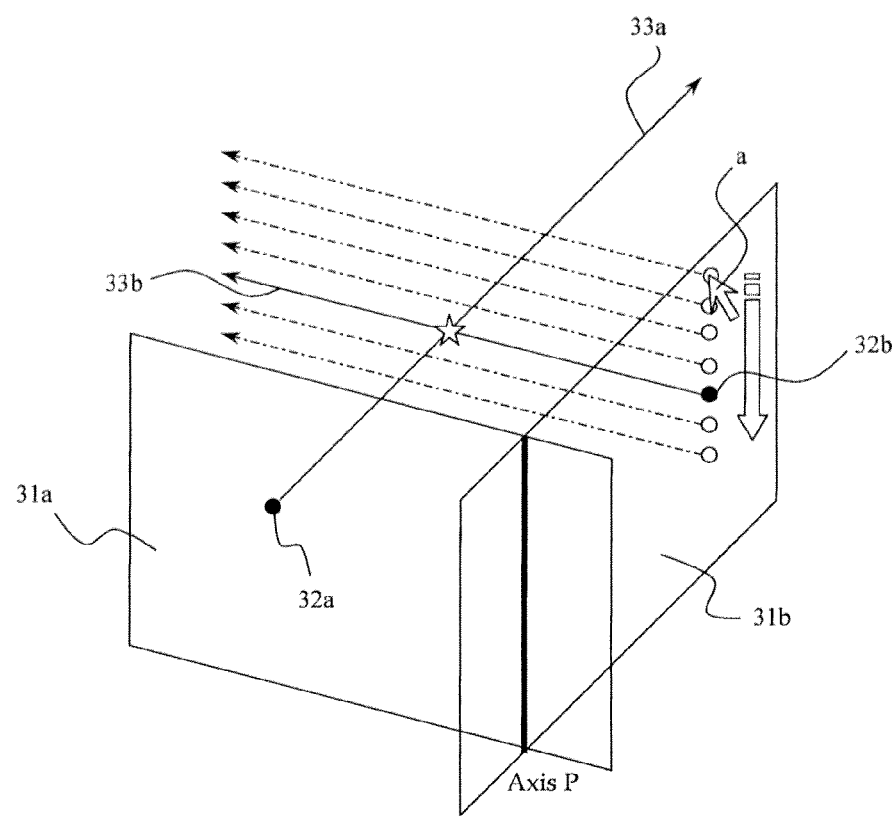
FIG. 16 is a view showing a process for calculating a point of intersection defined by two imaginary light beams in a 3-dimensional coordinate specifying device according to a fourth embodiment.
Figure 17:
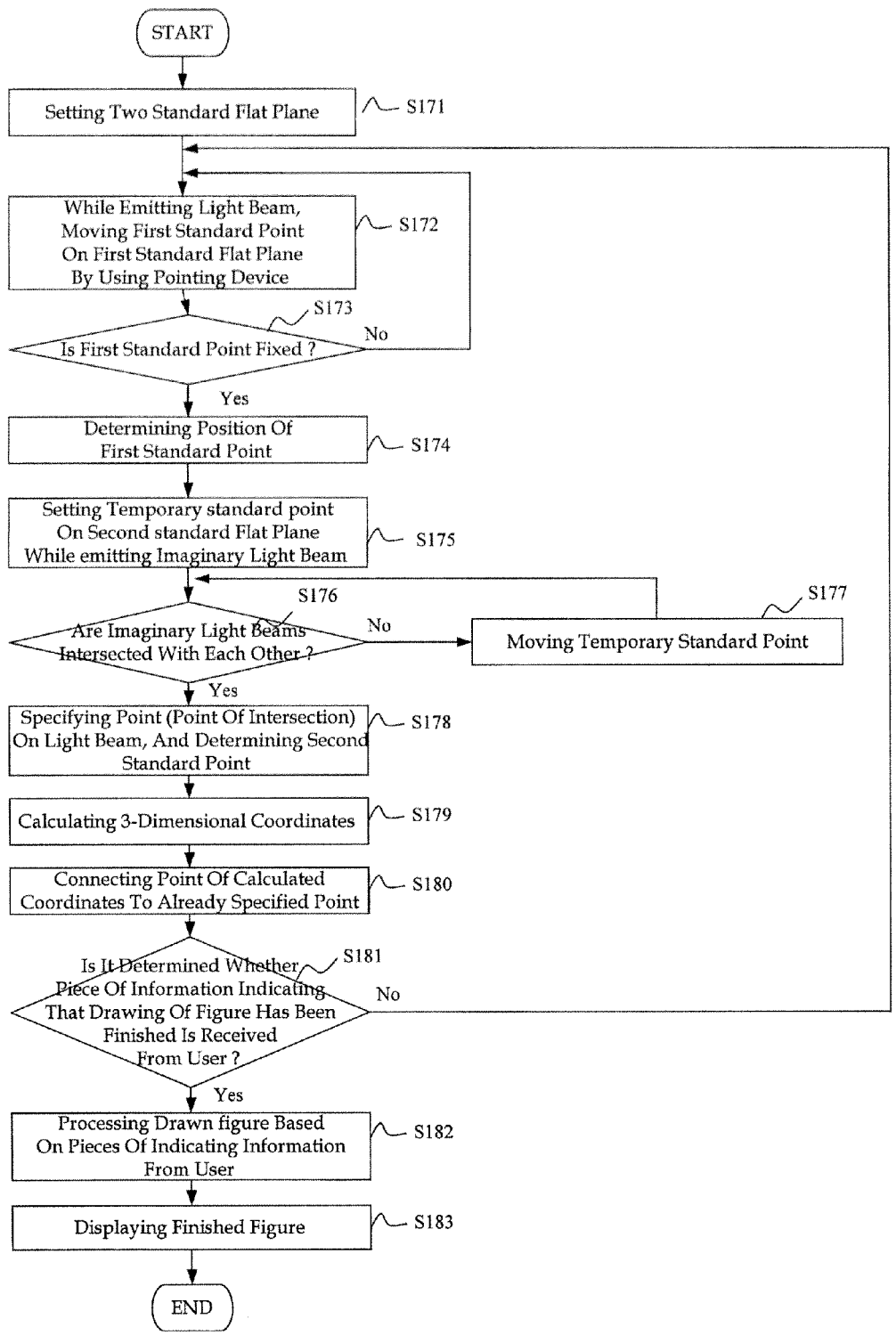
FIG. 17 is a flowchart showing an operation of the 3-dimensional coordinate specifying device according to the fourth embodiment.
Figure 18:
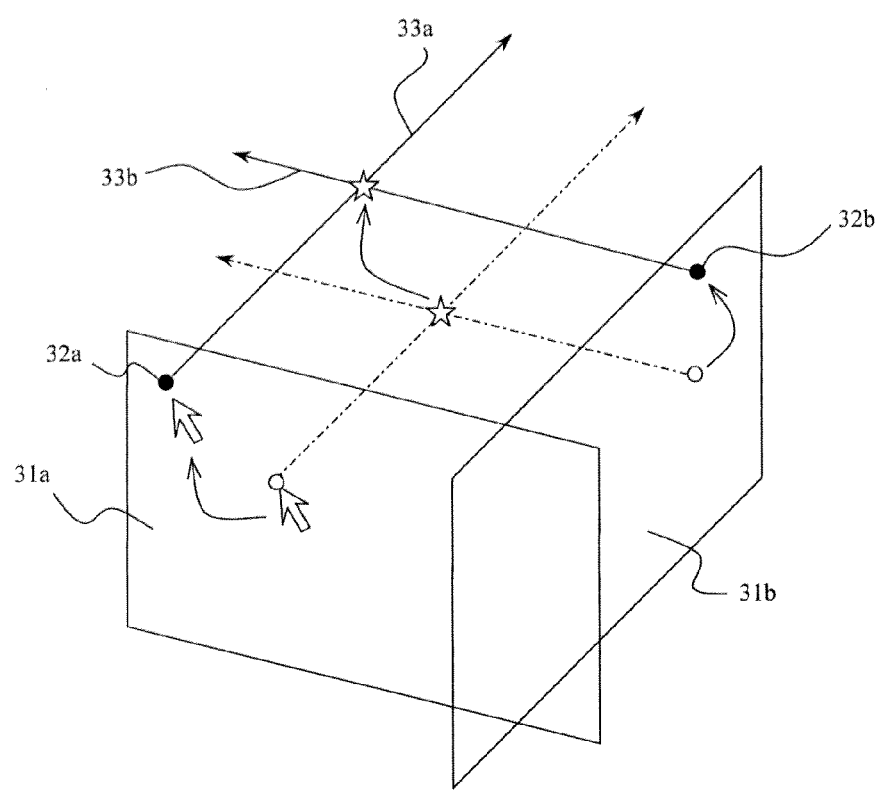
FIG. 18 is a view showing a follow movement between standard points and a point of intersection of two imaginary light beams in the 3-dimensional coordinate specifying device according to the fourth embodiment.

With reference to FIGS. 16 to 18, a 3-dimensional coordinate specifying device according to this embodiment will now be explained below. Note, in the description of the 3-dimensional coordinate specifying device according to this embodiment, the repetition of the same in each of the aforesaid embodiments is omitted.

In the 3-dimensional coordinate specifying device according to this embodiment, in order to specify points of intersection defined by a plurality of imaginary light beams, one standard point is fixed and emits an imaginary light beam, and another standard point is moved in an optional direction while emitting an imaginary light beam, so that a point of intersection is specified when the imaginary light beams are intersected with each other.

Although a functional block diagram of the 3-dimensional coordinate specifying device according to this embodiment is the same as in FIG. 11, the standard point moving section 24, the standard point determining section 23 and the point specifying section 26 specify the standard points and the point of intersection of the imaginary light beams so that the imaginary light beams are intersected with each other.

Referring to FIG. 16, a process for specifying a point intersection will be explained below. In FIG. 16, two standard flat planes 31a and 31b are set, and a point, which is defined by imaginary light beams 33a and 33b emitted from standard points 32a and 32b on the respective standard flat planes 31a and 31b, is specified. In this case, although it is possible to manually move each of the standard points 32a and 32b by user, using a pointing device such as a mouse or the like, to thereby find the point of intersection at which the imaginary light beams 33a and 33b are intersected with each other to specify the point of intersection, an accurate manipulation is required, and thus a working is very troublesome. Also, as stated above, in a case where the standard point 32b is moved by using the pointing device such as the mouse or the like so as to be made close to the imaginary light beam 33a by at least a certain distance, although the imaginary light beams 33a and 33b may be considered to be intersected with each other so that the position of the standard point 32b may be approximately determined, an manipulation for moving the pointing device such as the mouse or the like is required, and thus a working is very troublesome.

In this embodiment, in order to solve the aforesaid troublesome working, the point of intersection of the imaginary light beams is automatically specified, and it is possible to always maintain a state of the point of intersection even if the standard points are moved.

In FIG. 16, first, the standard point 32a is positioned at a desired position while emitting the imaginary light beam 33a. This processing is the same as in each of the aforesaid embodiments. Then, while emitting the imaginary light beam 32a, a point of intersection to be defined by the imaginary light beams 32a and 32b is found. In particular, if a position indicated by an arrow "a" is designated by using the pointing device such as the mouse or the like, such a position is defined as a temporary standard point (i.e., the uppermost one among open circles in the drawing). This temporary standard point is moved along an optional axis passing through the temporary standard point (e.g., an axis passing through the open circles in the drawing) while emitting the imaginary light beam 33b.

In this case, it is necessary to maintain the imaginary light beams 33a and 33b so as to be non-parallel to each other. By moving the temporary standard point along the optional axis existing on the standard flat plane 31b, the imaginary light beams 33a and 33b are intersected with each other so that the point of intersection can be specified. At this time, the temporary standard point is defined as a real standard point. According to this processing, it is possible to find the point of intersection of the imaginary light beams 33a and 33b by a calculation without any manipulation of the user.

Note, although the optional axis, along which the temporary standard point is moved, should exist on the standard flat plane 31b and be non-parallel to the imaginary light beam 33b (i.e., should be have a cross or twist positional relationship therebetween), more preferably, the optional axis must be defined as an axis which passes through a point designated by the pointing device such as the mouse or the like, and which is parallel to an axis P of intersection defined by the standard flat planes 31a and 31b.

Also, although an angle between each of the standard flat planes and a corresponding imaginary light beam can be optionally set by the user, in order to securely specify the point intersection of the imaginary light beams 33a and 33b, it is desirable to move the temporary standard point at the set angle or fixed angle while moving the temporary standard point.

Next, an operation will be explained. FIG. 17 is a flowchart showing the operation of the 3-dimensional coordinate specifying device according to this embodiment. First, pieces of information on a configuration of a displaying object, a manipulation of a user and so forth are input to the input section 12, and two standard flat planes are set by the standard plane setting section 22 based on the input pieces of information (S171). While an imaginary light beam is emitted from a first standard point on a first one of the set standard flat planes by the light beam emitting section 25, the first standard point is moved on the first standard flat plane by the standard point moving section 24 based on a piece of indication information input by the user, using the pointing device such as the mouse or the like (S172). It is determined whether a position of the first standard point is fixed (S173).

When the position of the first standard point is not fixed, the routine returns to step S172, and thus the movement of the first standard point is continuously controlled. When the first standard point is fixed, the first standard point is determined at the fixed position by the standard point determining section 23 (S174). When the first standard point is determined, a temporary standard point (i.e., a substitute for a second standard point) is set on the second standard flat plane by the standard point moving section 24 based on a piece of indication information input by the user, using the pointing device such as the mouse or the like, and an imaginary light beam is emitted from the temporary standard point by the light beam emitting section 25 (S175). It is determined whether the imaginary light beam emitted from the first standard point and the imaginary light beam emitted from the temporary standard point are intersected with each other (S176). When the imaginary light beam emitted from the first standard point and the imaginary light beam emitted from the temporary standard point are not intersected with each other, the temporary standard point is moved by the standard point moving section 24 (S177). The movement of the temporary standard point is carried out along a predetermined axis until the imaginary light beam emitted from the first standard point and the imaginary light beam emitted from the temporary standard point are intersected with each other. Accordingly, there must be a non-parallel relationship between the imaginary light beam emitted from the first standard point and the imaginary light beam emitted from the temporary standard point.

When the imaginary light beam emitted from the first standard point and the imaginary light beam emitted from the temporary standard point are intersected with each other, the point, at which the imaginary light beams are intersected with other, is specified as a point of intersection by the point specifying section 26, and the position of the temporary standard point is determined as the real second standard point by the standard point determining section 23 (S178). An explanation of the routine comprising steps S179 to S183 is omitted because this routine is the same as that comprising steps S136 to S140 in the flowchart of FIG. 14.

According to the above-mentioned processing, since it is possible to find the point of intersection of the two imaginary light beams by the calculation, it is unnecessary to carry out any manipulation of the user for specifying the point of intersection. Also, in this embodiment, when the first standard point is moved by using the pointing device such as the mouse or the like, the point of intersection of the imaginary light beams is moved with the movement of the first standard point, and the second standard point is moved so as to follow the point of intersection. In this case, an angle defined by the second standard flat plane and the imaginary light beam emitted therefrom is maintained at constant.

Referring to FIG. 18, the above-mentioned processing is concretely explained. First, it is supposed that the standard point 32a is moved on the standard flat plane 31a, using the pointing device such as the mouse or the like, as shown in the drawing (an open circle indicates the standard point 32a before the movement, and a solid circle indicates the standard point 32a after the movement.). In this case, the point of intersection (i.e., a star mark) is moved with the movement of the standard point 32a, and the standard point 32b on the standard flat plane 31b is moved so as to follow the point of intersection (an open circle indicates the standard point 32b before the movement, and a solid circle indicates the standard point 32b after the movement.).

Like this, when one standard point is moved, since another standard point and a point of intersection of imaginary light beams are moved so as to follow the movement of the one standard point, the point of intersection is maintained at a state in which it can be always specified, whereby not only can a standard point be intuitively moved by the user, but also it is possible to specify a 3-dimensional coordinates by a simple manipulation.

Although the present invention is explained based on the above-mentioned embodiments, the present invention is not limited to only the descriptions of the embodiment, it should be understood that various modifications and changes can be incorporated in each of the embodiments.

EXPLANATION OF REFERENCES 10 3-Dimensional Coordinate Determination Device
11 CPU
12 RAM
13 ROM
14 HD
15 Communication I/F
16 Input/Output I/F
20 Piece of Input Information
21 Input Section
22 Standard Plane Setting Section
23 Standard Point Determining Section
24 Standard Point Moving Section
25 Light Beam Emitting Section
26 Point Specifying Section
27 Coordinate Calculating Section
28 Distance Calculating Section
29 Display
31 Standard Flat Plane
32 Standard Point
33 Light Beam
34 (34a, 34b) Point of Intersection
35 Displaying Object
35a Object Flat Surface

The invention claimed is:

1. A 3-dimensional coordinate specifying device characterized by the fact that said device comprises:
a standard plane setter configured to set at least one optional standard flat plane, wherein when a displaying object displayed in a 3-dimensional space having an XYZ coordinate system has a flat plane, which is not parallel to any of an XY plane, a YZ plane and a ZX plane of the XYZ coordinate system, the standard flat plane is parallel to the flat plane, while when the displaying object has no flat plane, the standard flat plane is perpendicular or parallel to a coordinate plane;
a standard point determiner configured to determine an optional point on the standard flat plane, set by said standard plane setter, as a standard point;
a light beam emitter configured to emit an imaginary light beam at an optional angle from the standard point determined by said standard point determiner;
a point specifier configured to specify an optional point on the imaginary light beam emitted by said light beam emitter; and
a coordinate calculator configured to calculate 3-dimensional coordinates of the point specified by said point specifier.

2. The 3-dimensional coordinate specifying device as set forth in claim 1, characterized by the fact that said device further comprises a standard point mover configured to move the standard point, determined by said standard point determiner, on said standard flat plane.

3. The 3-dimensional coordinate specifying device as set forth in claim 1, characterized by the fact that a point of intersection, at which said imaginary light beam is intersected with a surface of at least one displaying object displayed in said 3-dimensional space, is specified by said point specifier.

4. The 3-dimensional coordinate specifying device as set forth in claim 3, characterized by the fact that a plurality of points of intersection, at which said imaginary light beam is intersected with a surface and/or a line of the displaying object displayed in said 3-dimensional space.

5. The 3-dimensional coordinate specifying device as set forth in claim 4, characterized by the fact:
that a plurality of displaying objects are displayed; and
that a plurality of points of intersection, at which said imaginary light beam is intersected with surfaces and/or lines of the displaying objects, are specified by said point specifier.

6. The 3-dimensional coordinate specifying device as set forth in claim 1, characterized by the fact:
that a plurality of optional points are specified by said point specifier; and
that said device further comprises a distance calculator configured to calculate a distance among the specified points.

7. The 3-dimensional coordinate specifying device as set forth in claim 1, characterized by the fact that a plurality of standard flat plane are set by said standard plane setter, an imaginary light beam being emitted from each of the set standard flat planes by said light beam emitter, a point of intersection of an imaginary light beam emitted from each of the set standard flat planes being specified by said point specifier.

8. The 3-dimensional coordinate specifying device as set forth in claim 7, characterized by the fact that points of intersection of the imaginary light beams emitted from the respective set standard flat planes are specified by said point specifier, said device further comprising a drawer configured to draw a line and a plane based on the specified points of intersection.

9. The 3-dimensional coordinate specifying device as set forth in claim 7, characterized by the fact:
that the imaginary light beams emitted from the standard flat planes are set so as to be non-parallel to each other; and
that a standard point, from which one of the imaginary light beams is emitted, is determined, and a standard point, from which another of the imaginary light beams is emitted, is determined, the standard point concerning the other imaginary light beam being moved in a direction of an optional axis passing through the standard point concerned, so that the other imaginary light beam is intersected with said one of the imaginary light beams to specify the point of intersection of the imaginary light beams.

10. The 3-dimensional coordinate specifying device as set forth in claim 9, characterized by the fact:
that said standard flat planes are non-parallel to each other, the imaginary light beam emitted from each of the standard flat planes being perpendicular to the standard flat plane concerned; and
that a standard point, from which one of the imaginary light beams is emitted, is determined, and a standard point, from which another of the imaginary light beams is emitted, is determined, the standard point concerning the other imaginary light beam being moved in a direction of an axis passing through the standard point concerned and defined as an axis of intersection by the standard flat planes, so that the point of intersection of the imaginary light beams is specified.

11. The 3-dimensional coordinate specifying device as set forth in claim 9, characterized by the fact that, when the standard point concerning said one of the imaginary light beams is moved, and when the point of intersection, at which said one of the imaginary light beams is intersected with the other imaginary light beam, is moved, the standard point concerning the other imaginary light beam is moved so as to follow said point of intersection while maintaining the angle defined by the other imaginary light beam and the standard flat plane concerning the other imaginary light beam.

12. A 3-dimensional coordinate specifying method of specifying 3-dimensional coordinates by a computer, characterized by the fact that said method comprises:
 a standard plane setting step of setting an optional standard flat plane, wherein when a displaying object displayed in a 3-dimensional space having an XYZ coordinate system has a flat plane, which is not parallel to any of an XY plane, a YZ plane and a ZX plane of the XYZ coordinate system, the standard flat plane is parallel to the flat plane, while when the displaying object has no flat plane, the standard flat plane is perpendicular or parallel to a coordinate plane;
 a standard point determining step of determining values of coordinates of an optional point on the standard flat plane set by said standard plane setting step;
 a light beam emitting step of emitting an imaginary light beam at an optional angle from the standard point determined by said standard point determining step;
 a point specifying step of specifying an optional point on the imaginary light beam emitted by said light beam emitting step; and
 a coordinate calculating step of calculating 3-dimensional coordinates of the point specified by said point specifying step.

13. A 3-dimensional coordinate specifying non-transitory computer-readable medium encoded with a computer program for operating a computer by:
 a standard plane setter configured to set an optional standard flat plane, wherein when a displaying object displayed in a 3-dimensional space having an XYZ coordinate system has a flat plane, which is not parallel to any of an XY plane, a YZ plane and a ZX plane of the XYZ coordinate system, the standard flat plane is parallel to the flat plane, while when the displaying object has no flat plane, the standard flat plane is perpendicular or parallel to a coordinate plane;
 a standard point determiner configured to determine values of coordinates of an optional point on the standard flat plane set by said standard plane setter;
 a light beam emitter configured to emit an imaginary light beam at an optional angle from the standard point determined by said standard point determiner;
 a point specifier configured to specify an optional point on the imaginary light beam emitted by said light beam emitter; and
 a coordinate calculator configured to calculate 3-dimensional coordinates of the point specified by said point specifier.

* * * * *